United States Patent [19]
Linke

[11] 3,920,315
[45] Nov. 18, 1975

[54] ZOOM PROJECTION LENS
[75] Inventor: Walter R. Linke, Chicago, Ill.
[73] Assignee: Bell & Howell Company, Chicago, Ill.
[22] Filed: Oct. 15, 1974
[21] Appl. No.: 514,340

[52] U.S. Cl........... 350/184; 350/175 NG; 350/189; 350/216
[51] Int. Cl.² .................... G02C 15/00; G02C 3/04
[58] Field of Search...... 350/184, 175 NG, 189, 216

[56] References Cited
UNITED STATES PATENTS
3,000,260  9/1961  Turula et al. ....................... 350/184
3,194,139  7/1965  Babcock ......................... 350/184 X Primary Examiner—Paul A. Sacher
Attorney, Agent, or Firm—John E. Peele, Jr.

[57] ABSTRACT

A projection lens system primarily for a motion picture projector is a glass and plastic lens design enabling lower manufacturing cost than a comparable all glass design of similar optical performance. In the preferred embodiment, each of the plastic elements is formed with an aspheric surface.

1 Claim, 17 Drawing Figures

F/1.61

F/2.30

−0.010   +0.010

6.43

4.55

−0.010   +0.010

F/1.54

F/2.20

10.03

7.13

ZOOM PROJECTION LENS

This invention relates to a projection lens system for motion picture projectors. More particularly, the lens system relates to a glass and plastic lens design enabling a lower manufacturing cost than comparable all glass lens designs of similar performance characteristics and optical corrections.

In recent years, zoom projection lenses have enjoyed a great deal of popularity with "amateur" motion picture enthusiasts. This popularity is enhanced by the ability of the lens to permit adjusting a projected image size while leaving the projector at a convenient location. The capability of adjusting the lenses between relative telephoto to wide-angle focal lengths overcomes the price differential usually present in that the all glass zoom lens designs are generally more expensive to manufacture than comparable single focal length projection lens designs of similar optical correction.

Manufacturing of glass elements requires an amount of grinding and polishing of each element resulting in a significant cost being attributed to each lens. To reduce the cost of the lens, an expedient is to replace selected glass elements with plastic elements, which can be molded to shape. Since plastic elements can be mass produced by molding at substantially less manufacturing costs than by grinding and polishing of glass and the raw plastic is of lower costs than glass, the final cost of a lens with plastic elements is lower than comparable lens with all glass elements. Generally, in the past, the use of plastic elements required more elements and resulted in lowering of selected characteristics and optical performance of the lens system. However, by molding one or more plastic elements with aspheric surfaces at little, if any, increase in cost of design and manufacture, the characteristics and corrections can be made to match, if not exceed these corrections of a comparable all glass lens design.

An object of the invention is to provide a highly corrected zoom projection lens system with a combination of plastic and glass elements, at least one of the plastic elements having an aspheric surface.

The above and other objects of the invention will be apparent by reference to the detailed description when taken in conjunction with the accompanying drawings, wherein like numerals refer to like parts.

Figure 1:
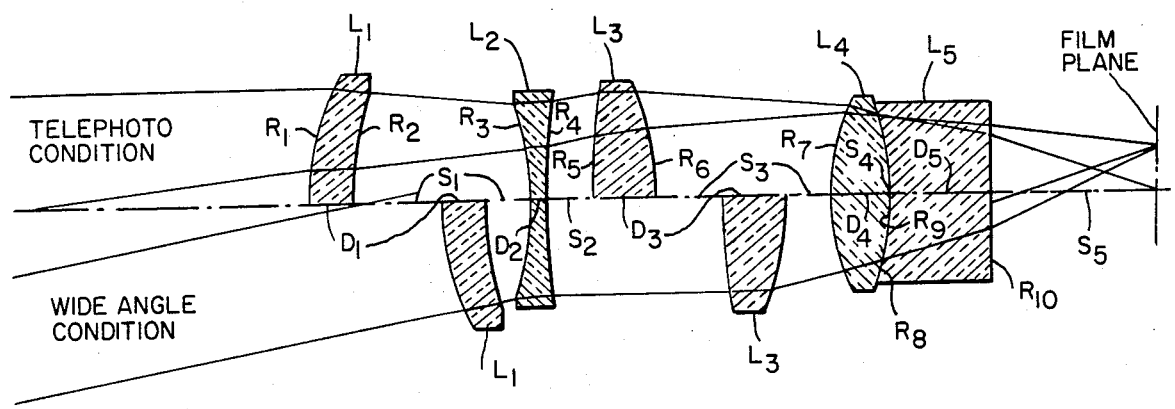
FIG. 1 is a diagrammatic view of a preferred form of the optical system of the invention in relatively long focal length or telephoto orientation and relatively short focal length or wide angle orientation.

With reference to FIG. 1 of the drawings, the preferred variable focal length projection lens system comprises four components as I to IV with five elements $L_1$ to $L_5$. The first component I is a positive meniscus type lens element $L_1$ with the outer surface $S_1$ of a spherical section and the internal surface $S_2$ of an aspheric section. By forming the aspheric surface on the element, correction by the element serves to correct distortions, such as coma, in the system to a greater degree than would a true glass meniscus element. The element $L_1$ is made as by molding of plastic material, such as polymethylmethacrylate, and results in a light weight, highly corrected element which can be more economically manufactured than by grinding and polishing of a similar glass element.

The second component II consists of a negative element $L_2$ molded preferably of the same plastic material. This element, air spaced from element $L_1$, has an aspheric surface $S_3$ proximate element $L_1$ and a slightly negative opposite surface $S_4$. This element $L_2$ while providing corrections for other optical aberrations tends to define the back focal length of the lens system.

Component III comprises element $L_3$, a positive element molded of plastic material with the surface $S_5$ adjacent element $L_2$ of spherical form and the surface $S_6$ remote therefrom of aspheric form. Element $L_3$ is air spaced from elements $L_2$ and component IV.

Component IV comprises elements $L_4$ and $L_5$. Element $L_4$ is slightly positive element manufactured of glass material with both surfaces $S_7$, $S_8$ of spherical form. Element $L_5$ is relatively thick negative element manufactured of glass material. This element $L_5$ is closely spaced with respect to element $L_4$.

As shown in the upper and lower portions of FIG. 1, certain components of the lens system are movable relative to other components to alter the focal length of the system. In the upper portion, showing the longer focal length arrangement or telephoto condition, components I and III are displaced axially forward from components II and IV. The shorter focal length arrangement or wide angle condition is shown in the lower portion with the components I and III closer to respective components II and IV. Typically, the lens design as set forth in this preferred example is capable of effective focal lengths variable between approximately 20 and 30 millimeters.

The optical values of the optical system of Fig. 1 are as follows:

TABLE I

| LENS | RADII (IN.) | THICKNESS (IN.) | SPACINGS (IN.) |
|---|---|---|---|
| $L_1$ | $R_1 = 0.8665$<br>$R_2 = A(1)$ | $D_1 = .1500$ | |
| | | | $S_1 = .5900$ to $.1500$ |
| $L_2$ | $R_3 = A(2)$<br>$R_4 = -2.7005$ | $D_2 = .0500$ | |
| | | | $S_2 = .1500$ to $.5900$ |
| $L_3$ | $R_5 = 2.4600$<br>$R_6 = A(3)$ | $D_3 = .2050$ | |
| | | | $S_3 = .5900$ to $.1500$ |
| $L_4$ | $R_7 = 0.6410$<br>$R_8 = 0.8494$ | $D_4 = .2020$ | |
| | | | $S_4 = .0007$ |
| $L_5$ | $R_9 = -0.8390$<br>$R_{10} = -36.2503$ | $D_5 = .3365$ | |

TABLE I-continued

| LENS | RADII (IN.) | THICKNESS (IN.) | SPACINGS (IN.) |
|---|---|---|---|
| | | | $S_5 = .5521$ BFL |

In the above table, the first column lists the lens elements numerically, starting at the ray exit side of the system. Each of the plastic elements, $L_1$ to $L_3$ has the same dispersive index and refractive index, i.e. $V=57.4$ and $N_D=1.4917$. The glass element $L_4$ has a dispersive index (V) of 58.6 and a refractive index ($N_D$) of 1.613. The element $L_5$ is of glass with a dispersive index (V) of 26.1 and a refractive index ($N_D$) of 1.785. The second column lists the respective radii and the vertex radii of the aspheric surfaces $*R_2$, $*R_3$ and $*R_6$, and wherein said aspheric surfaces are obtained from the formula;

$$Z_1 = (K(H^2-Z_0^2) + 2(AH^4+BH^6+CH^8+DH^{10}))/(2(1-KZ_0))$$
$$1/K = \text{RADIUS}$$

| Aspheric | A(1) | A(2) | A(3) |
|---|---|---|---|
| Radius | −1.41168 | −0.88773 | 0.96869 |
| K | −0.70838 | −1.12647 | 1.03232 |
| A | −5.05280×10 | 0.10297 | −0.11592 |
| B | −0.45509 | −0.35399 | 0.23708 |
| C | 0.36315×10¹ | −0.42505×10¹ | 0.18917×10¹ |
| D | −0.91353×10¹ | 0.14117×10² | −0.57625×10¹ | where $1/K$ is the vertex radius of curvature of the surface of the element; H is the Cartesian coordinate of a point on the surface referred in a vertical axis; Z is the Cartesian coordinate of a point on the surface referred in a horizontal axis. The third column lists the thickness of the respective elements. The fourth column lists the axial spacings between the respective elements and the nominal image plane. Respectively, the effective focal length of the elements are 4.1971, −1.3567, 1.4462, 0.6287 and −1.0412 in inches.

Figure 2A:
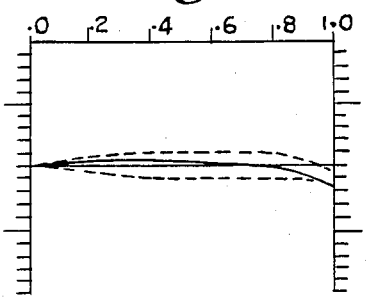
FIGS. 2a to 2h are graphical representations of the various aberrations for the telephoto condition of the lens system shown in FIG. 1, and having the design data given in Table 1.

FIG. 2a to 2h graphically represent various aberrations related to the telephoto condition of this preferred form of the lens system, as shown in FIG. 1 and having the design data recited in Table 1. FIG. 2a represents axial chromatic correction of three typical wavelengths forming rays on axis and lateral.

Figure 2B:
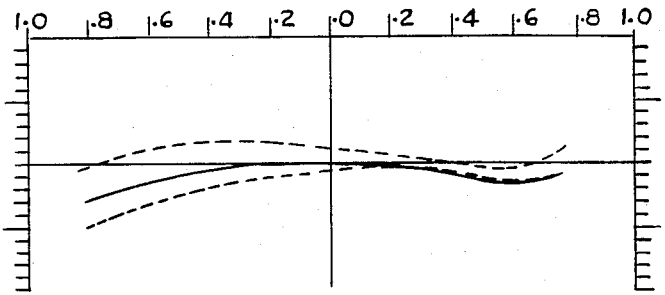
Figure 2D:
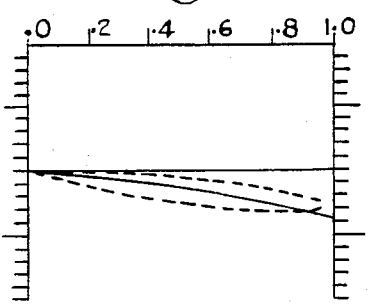
Figure 2C:
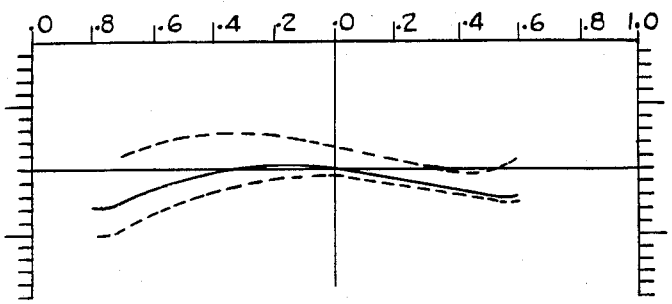
Figure 2E:
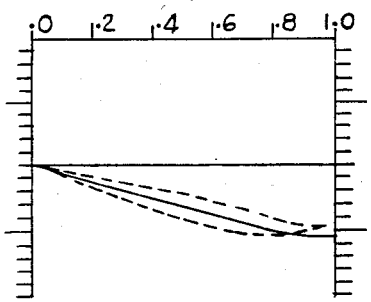
Figure 2F:
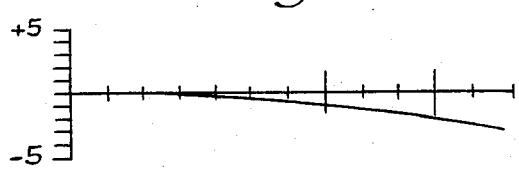
Figure 2G:
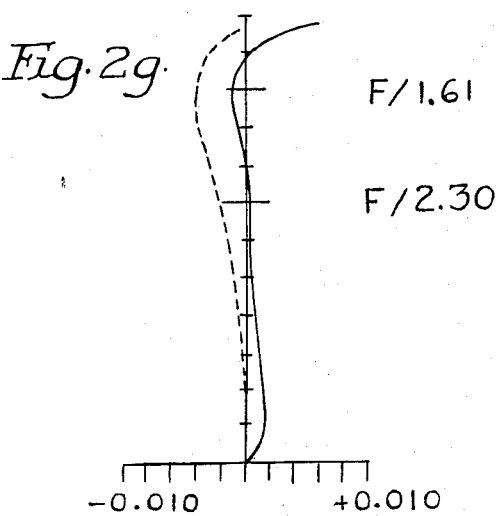
Figure 2H:
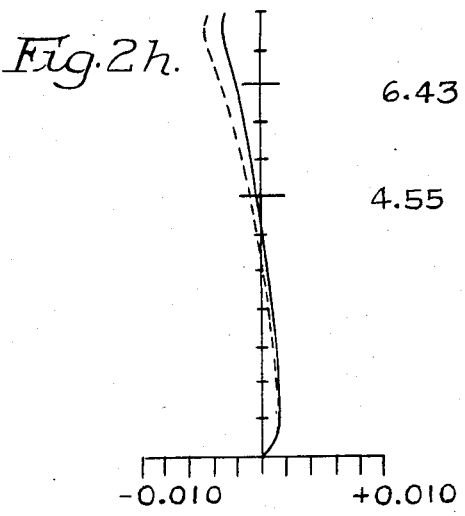

FIG. 2b represents off axis aberrations of a ray passing from the zone of the film format and through the lens transversely and tangentially. FIG. 2c represents the aberrations of the rays passing from the corner of the film format through the lens tangentially and transversely. FIG. 2d represents the radial or longitudinal aberration from the zone of the film format of rays entering the lens at 3 o'clock, while FIG. 2e represents similar aberrations from full field or corner rays. FIG. 2f represents distortion as a percentage of a "perfect" image. FIG. 2g represents the spherical aberration by a full line and the offense-against-sine-condition by the dotted line. FIG. 2R represents the curvature of field with tangential curvature being shown in full line and sagittal curvature being shown in dashed line.

Figure 3A:
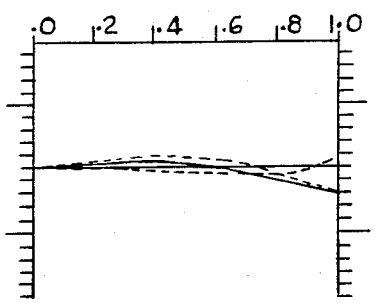
FIGS. 3a to 3h are graphical representations of the various aberrations for the wide angle condition of the lens system of FIG. 1.
Figure 3B:
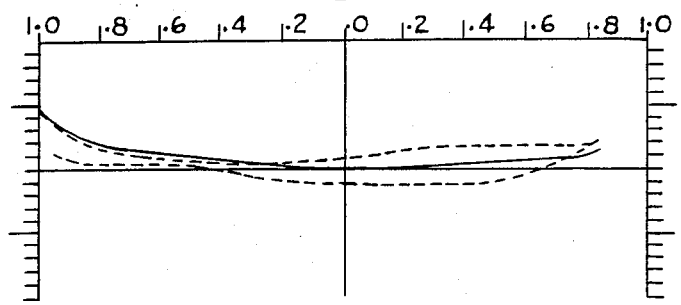
Figure 3D:
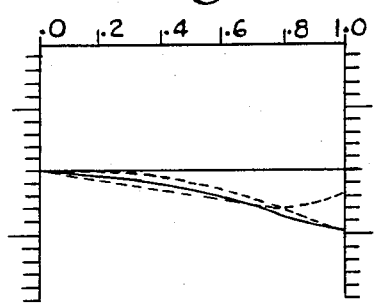
Figure 3C:
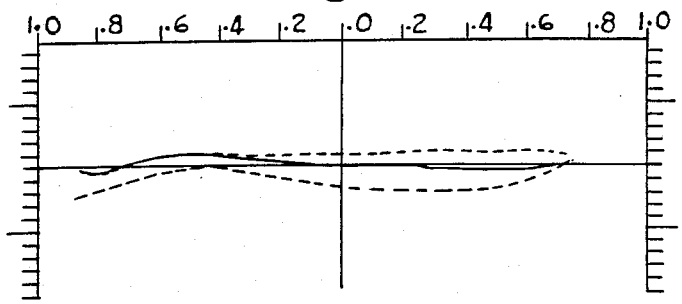
Figure 3E:
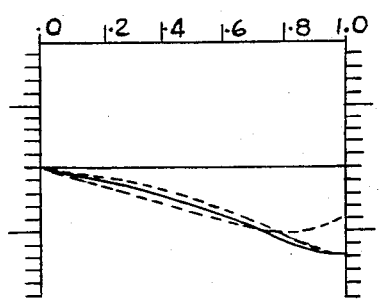
Figure 3F:
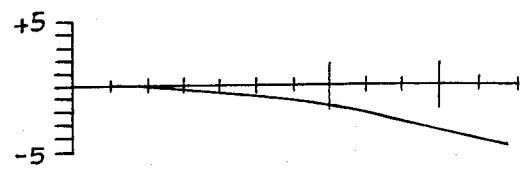
Figure 3G:
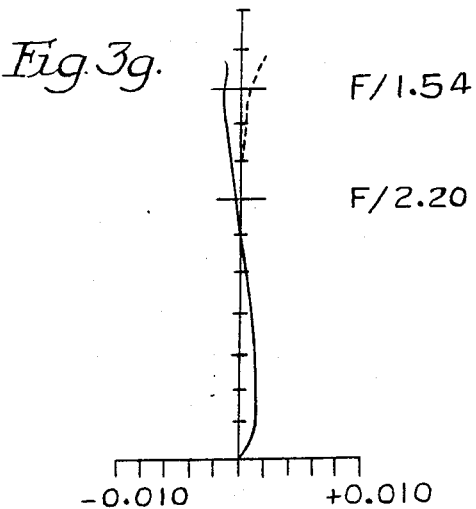
Figure 3H:
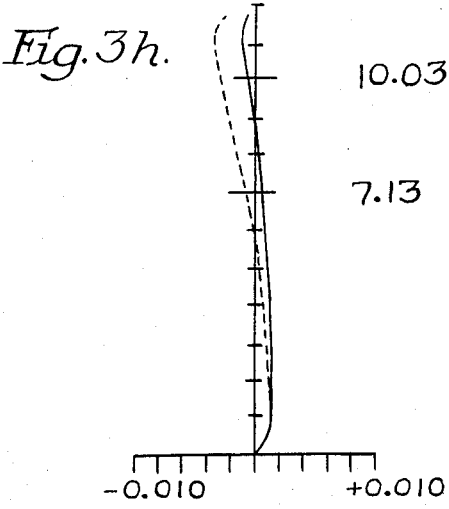

FIGS. 3a through 3R represent similar aberrations related to the wide angle condition of the lens system as those above identified with respect to the telephoto condition.

What is claimed is:

1. An optical system of a highly corrected zoom projection lens including a combination of glass and plastic elements, at least one of the plastic elements having an aspheric surface, the system having substantially the following specifications:

TABLE 1

| LENS | RADII (IN.) | THICKNESS (IN.) | SPACINGS (IN.) |
|---|---|---|---|
| $L_1$ | $R_1 = 0.8665$ | $D_1 = .1500$ | |
| | $*R_2 =- 1.41168$ | | |
| | | | $S_1 = .5900$ to .1500 |
| $L_2$ | $*R_3 =- 0.88773$ | $D_2 = .0500$ | |
| | $R_4 =- 2.7005$ | | |
| | | | $S_2 = .1500$ to .5900 |
| $L_3$ | $R_5 = 2.4600$ | $D_3 = .2050$ | |
| | $*R_6 = 0.96869$ | | |
| | | | $S_3 = .5900$ to .1500 |
| $L_4$ | $R_7 = 0.6410$ | $D_4 = .2020$ | |
| | $R_8 = 0.8494$ | | |
| | | | $S_4 = .0007$ |
| $L_5$ | $R_9 =- 0.8390$ | $D_5 = .3365$ | |
| | $R_{10}=-36.2503$ | | |
| | | | $S_5 = .5521$ BFL | wherein the first column lists the lens element numerically starting at the ray exit side of the system, the plastic elements having the same dispersive index and refractive index i.e., $V=57.4$ and $N_D=1.4917$, glass element $L_4$ having a dispersive index V of 58.6 and a refractive index $N_D$ of 1.613, the glass element $L_5$ having a dispersive index V of 26.1 and a refractive $N_D$ of 1.785; the second column lists the respective radii and vertex radii of the aspheric surfaces $*R_2$, $*R_3$, and $*R_6$, the negative (−) values of the radii indicate surfaces which are concave; the third column lists the thickness $D_1$ to $D_5$ of the respective elements; and the fourth column lists the axial spacings $S_1$ to $S_5$ between the respective elements and the image plane.

* * * * *